(12) United States Patent
Weber et al.

(10) Patent No.: US 9,127,160 B2
(45) Date of Patent: Sep. 8, 2015

(54) PROCESS FOR PRODUCING HIGH-PERFORMANCE THERMOPLASTICS WITH IMPROVED INTRINSIC COLOR

(71) Applicant: BASF SE, Ludwigshafen (DE)

(72) Inventors: Martin Weber, Maikammer (DE); Rolf Pinkos, Bad Dürkheim (DE); Thomas Vogler, Ludwigshafen (DE)

(73) Assignee: BASF SE, Ludwigshafen (DE)

( * ) Notice: Subject to any disclaimer, the term of this patent is extended or adjusted under 35 U.S.C. 154(b) by 132 days.

(21) Appl. No.: 13/902,236

(22) Filed: May 24, 2013

(65) Prior Publication Data

US 2013/0324648 A1 Dec. 5, 2013

Related U.S. Application Data

(60) Provisional application No. 61/652,344, filed on May 29, 2012.

(51) Int. Cl.
 *C08L 71/12* (2006.01)
 *C08G 65/48* (2006.01)

(52) U.S. Cl.
 CPC ............ *C08L 71/126* (2013.01); *C08G 65/48* (2013.01); *C08G 65/485* (2013.01)

(58) Field of Classification Search
 CPC ..... C08L 71/126; C08G 65/485; C08G 65/48
 USPC .......................................... 524/104; 528/174
 See application file for complete search history.

(56) References Cited

U.S. PATENT DOCUMENTS

| 4,857,625 | A | | 8/1989 | Clendinning et al. |
| 4,870,153 | A | | 9/1989 | Matzner et al. |
| 4,885,411 | A | * | 12/1989 | De Thomas et al. .......... 568/864 |
| 5,008,364 | A | | 4/1991 | Ittemann et al. |
| 5,086,157 | A | | 2/1992 | Reuter et al. |
| 2003/0004302 | A1 | | 1/2003 | Okamoto et al. |
| 2009/0312519 | A1 | * | 12/2009 | Uera et al. .................... 528/322 |

FOREIGN PATENT DOCUMENTS

| DE | 19501063 A1 | 7/1996 |
| DE | 10221177 A1 | 11/2002 |
| EP | 113112 A1 | 7/1984 |
| EP | 135 130 A2 | 3/1985 |
| EP | 297363 A2 | 1/1989 |
| EP | 362603 A1 | 4/1990 |
| WO | WO-2012065977 A1 | 5/2012 |
| WO | WO-2012084776 A1 | 6/2012 |
| WO | WO-2012084777 A1 | 6/2012 |
| WO | WO-2012095256 A1 | 7/2012 |
| WO | WO-2012095375 A1 | 7/2012 |
| WO | WO-2012095709 A1 | 7/2012 |
| WO | WO-2012095777 A1 | 7/2012 |
| WO | WO-2012098109 A1 | 7/2012 |
| WO | WO-2012156327 A1 | 11/2012 |
| WO | WO-2013007735 A1 | 1/2013 |
| WO | WO-2013020871 A1 | 2/2013 |
| WO | WO-2013045268 A2 | 4/2013 |

OTHER PUBLICATIONS

Johnson et al., "Poly(aryl Ethers) by Nucleophilic Aromatic Substitution. I. Synthesis and Properties", Journal of Polymer Science: Part A-1, 1967, vol. 5, pp. 2375-2398.
Viswanathan et al., "Characteristics of Polyarylene Ether Sulphones Prepared via a Potassium Carbonate DMAC Process", Polymer, 1984, vol. 25. pp. 1827-1835.

* cited by examiner

*Primary Examiner* — Kriellion Sanders
(74) *Attorney, Agent, or Firm* — Drinker Biddle & Reath LLP

(57) ABSTRACT

The present invention relates to a process for the work-up of polymer solutions comprising N-methyl-2-pyrrolidone and a polymer where the polymer solution is hydrogenated with hydrogen in the presence of a hydrogenation catalyst.
The present invention also relates to the product obtainable from said process, and to its use for producing, in particular, polyarylene ether products.

18 Claims, No Drawings

PROCESS FOR PRODUCING HIGH-PERFORMANCE THERMOPLASTICS WITH IMPROVED INTRINSIC COLOR

CROSS-REFERENCE TO RELATED APPLICATIONS

This patent application claims the benefit of U.S. provisional patent application Ser. No. 61/652,344 filed on May 29, 2012, incorporated in its entirety herein by reference.

BACKGROUND OF THE INVENTION

The present invention relates to a process for the work-up of polymer solutions comprising N-methyl-2-pyrrolidone and a polymer where the polymer solution is hydrogenated with hydrogen in the presence of a hydrogenation catalyst.

The present invention also relates to the product obtainable from said process, and to its use for producing, in particular, polyarylene ether products.

The present invention equally relates to a process for producing a polyarylene ether which comprises
(A) carrying out a polymerization reaction to produce the polyarylene ether
(B) removing inorganic constituents of the solution
(C) working the solution up in accordance with the process according to the invention
(D) producing polyarylene ether beads from the solution by separation into a precipitation bath, and
(E) extracting and drying the polyarylene ether beads.

The present invention also relates to the product obtainable from said process.

Polyarylene ethers, like polyarylene ether sulfones and polyarylene ether ketones, are, as is known to the person skilled in the art, high-performance thermoplastics, and feature high heat resistance, good mechanical properties, and inherent flame retardancy.

Polyarylene ethers, like polyarylene ether sulfones and polyarylene ether ketones, are often produced in solutions comprising N-methyl-2-pyrrolidone. N-Methyl-2-pyrrolidone (NMP) is a preferred solvent because its solvent properties permit very high polymer content in the polymer solution.

DE 195 01 063 discloses a process for the work-up of polyarylene ethers. The production of said polyarylene ethers is carried out for example in N-methylpyrrolidone in the presence of potassium carbonate. For the work-up the alkali metal halogenides formed during the reaction are removed from the reaction mixture, for example by means of filtration. Further work-up is carried out by precipitating the polyarylene ethers by adding of an aqueous base. By the process according to DE 195 01 063 polyarylene ethers with good properties are obtained. In terms of intrinsic color the polyarylene ethers according to DE 195 01 063 still show room for improvement.

DE 102 21 177 also discloses a process for the work-up of polyarylene ethers. For this the polyarylene ether solution is brought in contact with an adsorbent agent. In terms of intrinsic color the polymers according to DE 102 21 177 also still shows room for improvement.

An object was to provide a process which can produce polymers, in particular polyarylene ethers, and the resultant products from which have improved intrinsic color, increased soluble content, and improved melt stability value.

General information relating to the production of polyaryl ethers is found inter alia in R. N. Johnson et. al., and J. Polym. Sci. A-1 5 (1967) 2375, J. E. McGrath et. al., Polymer 25 (1984) 1827).

The person skilled in the art is aware of processes for producing polyarylene ether sulfones from aromatic bishalogen compounds and aromatic bisphenols or salts of these in the presence of at least one alkali metal carbonate or ammonium carbonate or alkali metal hydrogencarbonate or ammonium hydrogencarbonate, in an aprotic solvent, and these processes are known to the person skilled in the art, and are described in detail by way of example in U.S. Pat. No. 4,870,153, EP 113 112, EP-A 297 363, and EP-A 135 130, which at this point are expressly incorporated by way of reference. The following can in particular be found in those specifications by way of example: suitable starting materials, catalysts and solvents, suitable quantitative proportions of the substances involved, and suitable reaction times and suitable reaction parameters, such as reaction temperatures or reaction pressures, and also suitable work-up methods.

High-performance thermoplastics, such as polyaryl ethers, are produced by polycondensation reactions, where these are usually carried out at high reaction temperature in dipolar aprotic solvents, such as DMF, DMAc, sulfolane, DMSO, and NMP.

NMP is particularly preferred as solvent, because its good solvent properties also allow reactions to be carried out with very high polymer content. However, a disadvantage is the discoloration of the solvent during the condensation reaction, leading to ongoing discoloration of the polymer.

BRIEF SUMMARY OF THE INVENTION

It was therefore an object of the present patent application to provide a process which can produce the high-performance thermoplastics polyaryl ethers and polyetherimides with improved intrinsic color. The design of the process should at the same time be such as to minimize conversion of N-methylpyrrolidone to byproducts.

It was a further object of the present patent application to provide a process for producing polyarylene ethers which show improved intrinsic color. A measure for the intrinsic color of polymers is the so-called yellowness index (YI). The yellowness index can be measured according to DIN 6167 EN "description of yellowness of near-white or near-colourless materials", Jan. 1, 1980. The yellowness index (YI), therefore, is a measure for the intrinsic color of polymers.

The object of the invention is achieved via processes defined in the introduction, namely a process for the work-up of polymer solutions comprising N-methyl-2-pyrrolidone and a polymer where the polymer solution is hydrogenated with hydrogen in the presence of a hydrogenation catalyst.

A DETAILED DESCRIPTION OF THE INVENTION

A polymer solution is understood to be a solution which can comprise one or more solvents and one or more polymers. The polymer solution can moreover comprise materials which derive from the production process. Among these are contaminants, and also starting materials. In particular, the polymer solution can also comprise monomers, and also salts from the production process for the polymers, e.g. sodium carbonate, potassium carbonate, potassium chloride, or sodium chloride. Byproducts and/or decomposition products can also be present in the polymer solution.

The work-up preferably takes place via reaction of the polymer solution with hydrogen in the presence of hydrogenation catalysts. Hydrogen can be used at purity levels of from 95% by volume to 99.99999% by volume, where the % by volume values are based on the total volume of the hydrogen introduced for hydrogenation purposes.

A homogeneously soluble catalyst or a heterogeneous catalyst can be used as hydrogenation catalyst.

The hydrogenation catalyst preferably comprises elements of the periodic table selected from the group of ruthenium, cobalt, rhodium, iridium, nickel, palladium, platinum, copper, silver, gold, lanthanum, rhenium and mixtures of these. Particular preference is given to the elements selected from the group of ruthenium, cobalt, nickel, palladium, copper, and mixtures of these.

The hydrogenation catalyst can comprise the elements in the form of their metals, in the form of insoluble compounds, such as the oxides of the elements, or in the form of homogeneously soluble metal complexes, or a mixture of these.

If a homogeneously soluble catalyst is used as hydrogenation catalyst, this preferably comprises ruthenium.

It is particularly preferable to use a heterogeneous hydrogenation catalyst. The heterogeneous hydrogenation catalyst used can take the form of an all-active catalyst, impregnated catalyst, or precipitated catalyst. The abovementioned heterogeneous hydrogenation catalysts, and also production thereof, are described in Handbook of Heterogeneous Catalysis, Wiley VCH, Weinheim, 2nd edition 2008, volumes 1-8, editors Gerhard Ertl, Helmut Knözinger, Ferdi Schüth, Jens Weitkamp.

The impregnated or precipitated catalyst generally comprises a support material and/or framework material. The support material and/or framework material can be carbon, such as activated carbon or graphite, aluminum oxides, silicon oxides, titanium oxides, cerium oxides, or zirconium oxides, or a mixture of these.

The proportion of the hydrogenation element, based on the total weight of the catalyst, can be from 0.001 to 90% by weight, where the total % by weight values for the hydrogenation element and for the support material and/or framework material is 100% by weight.

If an impregnation catalyst is used as heterogeneous hydrogenation catalyst, the proportion of hydrogenation element, based on the total weight of the catalyst, can be from 0.001 to 20% by weight, preferably from 0.01 to 10% by weight, in particular from 0.1 to 5% by weight, where the total of the % by weight values for the hydrogenation element and for the support material and/or framework material is 100% by weight.

Preference is given to a heterogeneous hydrogenation catalyst comprising from 10 to 99.999% by weight of aluminum oxide and/or of zinc oxide and from 0.001 to 90% by weight of cobalt, nickel, copper, palladium, or a mixture of these.

A polyarylene ether can be used as polymer. Another object of the present invention, therefore, is a process, where a polyarylene ether solution is used as a polymer solution. Polyarylene ethers are a class of polymer known to the person skilled in the art. In principle, it is possible to use any of the polyarylene ethers that are known to the person skilled in the art and/or that can be produced by known methods. Appropriate methods are explained at a later stage below.

Preferred polyarylene ethers are composed of units of the general formula I:

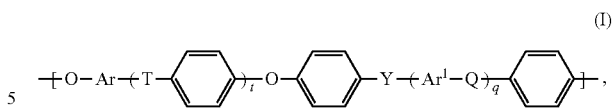

where the definitions of the symbols t, q, Q, T, Y, Ar, and Ar¹ are as follows:

t and q: are mutually independently 0, 1, 2, or 3,

Q, T, and Y: are mutually independently respectively a chemical bond or group selected from —O—, —S—, —SO$_2$—, S=O, C=O, —N=N— and —CR$^a$R$^b$—, where R$^a$ and R$^b$ are mutually independently respectively a hydrogen atom or a C$_1$-C$_{12}$-alkyl, C$_1$-C$_{12}$-alkoxy or C$_6$-C$_{18}$-aryl group, and where at least one of Q, T and Y is —SO$_2$—, and Ar and Ar¹: are mutually independently an arylene group having from 6 to 18 carbon atoms.

If Q, T, or Y, with the abovementioned preconditions, is a chemical bond, this means that the adjacent group on the left-hand side and the adjacent group on the right-hand side have direct linkage to one another by way of a chemical bond.

However, it is preferable that Q, T, and Y in formula I are mutually independently selected from —O— and —SO$_2$—, with the provision that at least one of the group consisting of Q, T, and Y is —SO$_2$—.

To the extent that Q, T, or Y is —CR$^a$R$^b$—, R$^a$ and R$^b$ are mutually independently respectively a hydrogen atom or a C$_1$-C$_{12}$-alkyl, C$_1$-C$_{12}$-alkoxy or C$_6$-C$_{18}$-aryl group.

Preferred C$_1$-C$_{12}$-alkyl groups comprise linear and branched, saturated alkyl groups having from 1 to 12 carbon atoms. Particular mention may be made of the following moieties: C$_1$-C$_6$-alkyl moiety, such as methyl, ethyl, n-propyl, iospropyl, n-butyl, sec-butyl, 2- or 3-methylpentyl, and longer-chain moieties, such as unbranched heptyl, octyl, nonyl, decyl, undecyl, and lauryl, and the singly or multiply branched analogs thereof.

Alkyl moieties that can be used in the abovementioned C$_1$-C$_{12}$-alkoxy groups that can be used are the alkyl groups defined at an earlier stage above having from 1 to 12 carbon atoms. Cycloalkyl moieties that can be used with preference in particular comprise C$_3$-C$_{12}$-cycloalkyl moieties, for example cyclopropyl, cyclobutyl, cyclopentyl, cyclohexyl, cycloheptyl, cyclooctyl, cyclopropylmethyl, cyclopropylethyl, cyclopropylpropyl, cyclobutylmethyl, cyclobutylethyl, cyclopentylethyl, -propyl, -butyl, -pentyl, -hexyl, cyclohexylmethyl, -dimethyl, and -trimethyl.

Ar and Ar¹ are mutually independently C$_6$-C$_{18}$-arylene groups. On the basis of the starting materials described at a later stage below, Ar is preferably derived from an electron-rich aromatic substance that is readily susceptible to electrophilic attack, and that is preferably selected from the group consisting of hydroquinone, resorcinol, dihydroxynaphthalene, in particular 2,7-dihydroxynaphthalene, and 4,4'-bisphenol. Ar¹ is preferably an unsubstituted C$_6$- or C$_{12}$-arylene group.

Particular C$_6$-C$_{18}$-arylene groups Ar and Ar¹ that can be used are phenylene groups, such as 1,2-, 1,3-, and 1,4-phenylene, naphthylene groups, such as 1,6-, 1,7-, 2,6-, and 2,7-naphthylene, and also the arylene groups derived from anthracene, from phenanthrene, and from naphthacene.

It is preferable that, in the preferred embodiment of formula I, Ar and Ar¹ are selected mutually independently from the group consisting of 1,4-phenylene, 1,3-phenylene, naphthylene, in particular 2,7-dihydroxynaphthylene, and 4,4'-bisphenylene.

Preferred polyarylene ethers are those comprising at least one of the following units Ia to Io as repeating structural units:

In one particularly preferred embodiment, Ar=1,4-phenylene, t=1, q=0, T is a chemical bond, and Y=SO$_2$. Particu-

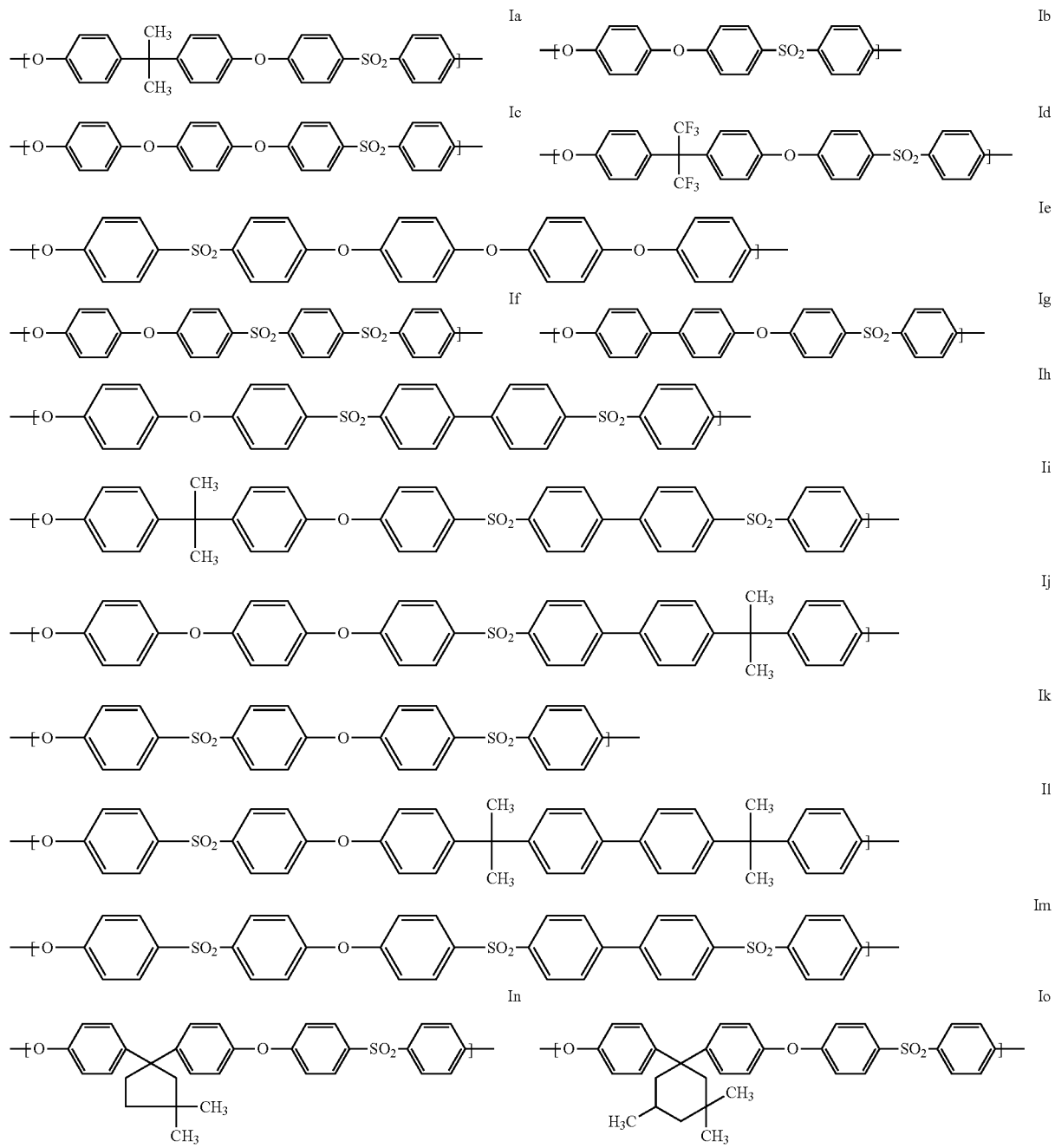

Other preferred units in addition to the preferred units Ia to Io are those in which one or more 1,4-phenylene units which derive from hydroquinone have been replaced by 1,3-phenylene units which derive from resorcinol, or by naphthylene units which derive from dihydroxynaphthalene.

Particularly preferred units of the general formula I are the units Ia, Ig, and Ik. Particular preference is moreover given to polyarylene ethers of component (A) which are composed essentially of one type of units of the general formula I, in particular of a unit selected from Ia, Ig, and Ik.

larly preferred polyarylene ether sulfones (A) composed of the abovementioned repeating unit are termed polyphenylene sulfone (PPSU) (formula Ig).

In another particularly preferred embodiment, Ar=1,4-phenylene, t=1, q=0, T=C(CH$_3$)$_2$, and Y=SO$_2$. Particularly preferred polyarylene ether sulfones (A) composed of the abovementioned repeating unit are termed polysulfone (PSU) (formula Ia).

In another particularly preferred embodiment, Ar=1,4-phenylene, t=1, q=0, and T=Y=SO$_2$. Particularly preferred polyarylene ether sulfones composed of the abovementioned repeating unit are termed polyether sulfone (PESU) (formula Ik).

For the purposes of the present invention, abbreviations, such as PPSU, PESU, and PSU are in accordance with DIN EN ISO 1043-1 (Plastics—Symbols and abbreviated terms—Part 1: Basic polymers and their special characteristics (ISO 1043-1:2001); German version EN ISO 1043-1:2002).

The weight-average molar masses of the polyarylene ethers are preferably from 10 000 to 150 000 g/mol, in particular from 15 000 to 120 000 g/mol, particularly preferably from 18 000 to 100 000 g/mol, determined by means of gel permeation chromatography in the solvent dimethylacetamide against narrowly distributed polymethyl methacrylates as standard.

Production processes which lead to the abovementioned polyarylene ethers are known per se to the person skilled in the art and are described by way of example in Herman F. Mark, "Encyclopedia of Polymer Science and Technology", third edition, volume 4, 2003, "Polysulfones" chapter on pages 2 to 8, and also Hans R. Kricheldorf, "Aromatic Polyethers" in: Handbook of Polymer Synthesis, second edition, 2005 on pages 427 to 443.

Particular preference is given to the reaction of at least one aromatic compound having two halogen substituents and of at least one aromatic compound having two functional groups which are reactive toward abovementioned halogen substituents, in aprotic polar solvents in the presence of anhydrous alkali metal carbonate, in particular sodium carbonate, potassium carbonate, calcium carbonate, or a mixture thereof, very particular preference being given here to potassium carbonate. A particularly suitable combination is N-methylpyrrolidone as solvent and potassium carbonate as base.

It is preferable that the polyarylene ethers have either terminal halogen groups, in particular terminal chlorine groups, or etherified terminal groups, in particular terminal alkyl ether groups, where these are obtainable via reaction of the terminal OH groups or terminal phenolate groups with suitable etherifying agents.

Examples of suitable etherifying agents are monofunctional alkyl or aryl halide, for example $C_1$-$C_6$-alkyl chloride, $C_1$-$C_6$-alkyl bromide, or $C_1$-$C_6$-alkyl iodide, preferably methyl chloride, or benzyl chloride, benzyl bromide, or benzyl iodide, or a mixture thereof. Preferred terminal groups for the purposes of the polyarylene ethers are halogen, in particular chlorine, alkoxy, in particular methoxy, aryloxy, in particular phenoxy, and benzyloxy.

The process for the work-up of polymer solutions is, as far as possible, carried out at pressures and temperatures at which the solvent is stable. It is particularly preferable to carry out the work-up at pressures and temperatures at which the amount of NMP hydrogenated, based on the total weight of the NMP used, is from 0.0001% by weight to 5% by weight, preferably from 0.0001% by weight to 2.5% by weight, particularly preferably from 0.0001% by weight to 1% by weight. Pressure and temperature are also selected in such a way that any aromatic and/or sulfone groups in the polyarylene ether are not subjected to reaction.

The process for the work-up of polymer solutions can be carried out at a pressure of from 1 bar to 320 bar.

The process for the work-up of polymer solutions can be carried out at a temperature of from 20 to 250° C., preferably from 20 to 200° C., particularly preferably from 20 to 150° C.

The process for the work-up of polymer solutions in the presence of a heterogeneous hydrogenation catalyst can be carried out in a fixed bed or in suspension. Preference is given to the process for the work-up of polymer solutions with a fixed-bed catalyst in downflow mode or upflow mode. The process can be carried out with, or preferably without, liquid circulation.

Therefore, another object of the present invention is the product obtained from the process for the work-up of the polymer solution. The product preferably shows a yellowness index (YI) in the range of 10 to 79. The yellowness index is measured according to DIN 6167 EN. Preferably the products show a yellowness index in the range of 10 to <40. Especially preferred the products show a yellowness index in the range of 10 to 38.

The polymer solution feed that is subjected to the hydrogenation step is passed through the catalyst bed together with hydrogen. The reaction output is depressurized at least to the pressure level established in the subsequent precipitation process.

The invention also provides a process for producing a polyarylene ether, which comprises
(A) carrying out a polymerization reaction to produce the polyarylene ether
(B) removing inorganic constituents of the solution
(C) treating the solution in accordance with the work-up process according to the invention
(D) producing polyarylene ether beads from the solution by separation into a precipitation bath, and
(E) extracting and drying the polyarylene ether beads.

A polymerization reaction (A) for the production of a polyarylene ether is known, as described above, to the person skilled in the art. Processes for the removal of inorganic constituents (B) are equally known to the person skilled in the art. Processes for solid/liquid filtration are described in "Handbuch der industriellen Fest/Flüssig-Filtration" [Handbook of industrial solid/liquid filtration], H. Gasper, D. Oechsle, E. Pongratz, Wiley-VCH, Weinheim, 2000. The separation of a polymer solution (D) is equally known to the person skilled in the art, for example from DE 3 644 464 A1. The extraction and drying of polymer particles is also known to the person skilled in the art.

Surprisingly, the work-up of the polymer solution in step (C) in the invention leads to better optical properties and to melt stability, and also to a reduction in insoluble content after heat-aging at 400° C. for 1 hour, in each case of moldings produced from the polyarylene ether beads provided from said process.

The invention also provides a product from the process for the production of a polyarylene ether in steps (A) to (E).

The invention also provides a product from the process for the production of a polyarylene ether in steps (A) to (E) where the yellowness index of a sheet of thickness 2 mm produced from polyarylene ether beads (via injection molding in a mold with polished surface at 350° C. melt temperature and 150° C. mold temperature) is from 20 to 79, measured in accordance with DIN 6167. Preferably the products show a yellowness index in the range of 10 to <40. Especially preferred the products show a yellowness index in the range of 10 to 38.

The invention further provides a product from the process for the production of a polyarylene ether in steps (A) to (E) where the soluble content of the product after heat-aging for 1 hour at 400° C. in a capillary rheometer is from 92 to 99.5% by weight. (The measurement uses the intensity of the product peak in GPC measurement of a solution at a concentration of 4 mg/ml after calibration with pure PESU).

The invention also provides a product from the process for the work-up of polymer solutions comprising N-methyl-2-pyrrolidone and a polymer where the polymer solution is hydrogenated with hydrogen in the presence of a hydrogenation catalyst.

The invention also provides the use of a solution from the process for the work-up of polymer solutions for the production of polymer products comprising N-Methyl-2-pyrrolidone and a polymer where the polymer solution is hydrogenated with hydrogen in the presence of a hydrogenation catalyst.

Polymer products are products which have been subjected to an extraction process, drying process, and/or shaping process. The application therefore also provides products from the process where these, after work-up, for example extraction and drying, are converted to a marketable form, for example pellets, powders, granules, chips, grains, or filaments.

EXAMPLES

The intrinsic viscosity of the polyarylene ethers was determined in 1% N-methyl-pyrrolidone solution at 25° C. in accordance with DIN EN ISO 1628-1.

Yellowness index (YI) was measured in accordance with DIN 6167 EN "Description of yellowness of near-white or near-colourless materials", Jan. 1, 1980.

The transparency value and the haze value were determined in accordance with ASTM D1003 EN "Standard Test Method for Haze and Luminous Transmittance of Transparent Plastics", Jan. 1, 2011.

The polyarylene ether sulfone polymer solution was isolated by separation of the polymer solution by way of a capillary into deionized water at 25° C. (drop height 0.5 m, throughput about 2.5 L/h). The resultant polyarylene ether at 150° C. sulfone beads were then extracted with water at 85° C. for 20 h (water throughput 160 L/h). The beads were then dried in vacuo (<100 mbar) to a residual moisture level of less than 0.1% by weight. The dried polyarylene ether sulfone beads were extruded at a melt temperature of 350° C. and with a throughput of 2.5 kg/h in a twin-screw extruder (PTW 16 Thermo Scientific) to give granules.

The granules were processed by means of injection molding at 350° C. melt temperature and 150° C. mold temperature to give sheets of thickness 2 mm for optical measurements.

The melt stability of the products was determined via measurements in a capillary rheometer. For sample preparation, the material was dried in vacuo (<100 mbar) at 125° C. for 3 days. In a Rosand capillary viscometer, the melt was then forced at 400° C. through a capillary of length 16 mm with perfectly circular cross section measuring 0.5 mm. The volume throughput was prescribed, and the test pressure was measured. Apparent viscosity at 400° C. at a shear rate of 1000 $s^{-1}$ was determined from the test pressure, as a function of residence time. The quotient (Q) calculated from the value measured after 60 minutes and the initial value (after 5 minutes) was determined.

GPC (25° C., DMAc as solvent, PMMA samples as standard with Mw/Mn ratio smaller than 1.2) was also used to determine molecular weight and soluble content of the strands extruded after 60 minutes at 400° C.

Gas chromatography was carried out in an HP6890 (FID, nitrogen carrier gas at 1.0 mL/min (const. flow); split ratio 1:50; RTX-1 column, 30 m, 0.32 mm, 1.0 µm film; temperature program: start at 80° C., then 5° C./min to 140° C., then 5° C./min to 200° C., and 10 min isothermally, then 10° C./min to 340° C., and 8 min isothermally)

Production of Polymer Solution:

574.16 g of dichlorodiphenyl sulfone (DCDPS), 500.34 g of dihydroxydiphenyl sulfone (DHDPS), and 290.24 g of potassium carbonate were suspended in 1053 ml of NMP under nitrogen in a 4 L reactor with internal thermometer, gas-inlet tube, and reflux condenser with water separator. The mixture is heated to 190° C. within 1 hour. The residence time at 190° C. is considered to be the reaction time. The water of reaction was removed by distillation, and the fill level was kept constant by adding NMP during the reaction. After 3.5 h of reaction time, the reaction was terminated by dilution with cold NMP (1947 ml), and then at 140° C., methyl chloride (10 l/h) was introduced (for 45 minutes) into the mixture. Nitrogen was then introduced (20 l/h), and the mixture was cooled. The resultant potassium chloride was removed by filtration.

The polymer solution was further diluted to a concentration of 928 g of polymer/4.5 l of NMP by adding 1.5 l of NMP.

Hydrogenation Experiments

Examples 2 and 3

The hydrogenation process was carried out in a continuous system with an isothermally operated tubular reactor (length 1.8 m, internal diameter 1.0 cm) by the straight-pass method and with a Cu/La oxide/Al oxide catalyst produced in accordance with WO 2006/005505, example 3 (catalyst activation in the system: 70 h at 180° C., 50 NL/h of $N_2$, 4 NL/h of $H_2$; then 7 h at 180° C., 4 NL/h of $H_2$, 190 mL, 190 mL (NL=standard liters, i.e. volume of gas under standard conditions). Ancillary heating was provided here not only to the feed but also to the lines, to from 90 to 100° C., in order to maintain the flowability of the polymer solution in NMP. All of the experiments were carried out with a loading of 1.1 $kg_{polymer\ solution}/L_{cat}/h$, and the resultant polymer solutions were then, as previously described, precipitated out and worked up. In the hydrogenation experiments, the feeds and outputs were always blanketed with argon.

Conversion of NMP to N-methylpyrrolidine was in all cases below 2.5 GC-area %.

For comparative example V1 the polymer solution was precipitated and worked up without hydrogenation.

V4: Comparative Example According to DE 195 01 063 Worked-Up by Addition of an Aqueous Base.

574.16 g of dichlorodiphenyl sulfone (DCDPS), 500.34 g of dihydroxydiphenyl sulfone (DHDPS), and 290.24 g of potassium carbonate were suspended in 1053 ml of NMP under nitrogen in a 4 L reactor with internal thermometer, gas-inlet tube, and reflux condenser with water separator. The mixture is heated to 190° C. within 1 hour. The residence time at 190° C. is considered to be the reaction time. The water of reaction was removed by distillation, and the fill level was kept constant by adding NMP during the reaction. After 3.5 h of reaction time, the reaction was terminated by dilution with cold NMP (1947 ml), and then at 140° C., methyl chloride (10 l/h) was introduced (for 45 minutes) into the mixture. Nitrogen was then introduced (20 l/h), and the mixture was cooled. The resultant potassium chloride was removed by filtration.

The polymer solution was further diluted to a concentration of 928 g of polymer/4.5 l of NMP by adding 1.5 l of NMP.

The solution was precipitated in an aqueous solution of potassium carbonate (pH 11) according to DE 195 01 063. The filtrate was washed four times with 1 L of aqueous potassium carbonate solution (pH 11) each time. Subsequently, the filtrate was dried to residual moisture below 0.1%. Further work-up was carried out as described above.

V5: Comparative Example According to DE 102 21 177, Worked-Up by Means of an Adsorbent Agent.

574.16 g of dichlorodiphenyl sulfone (DCDPS), 500.34 g of dihydroxydiphenyl sulfone (DHDPS), and 290.24 g of potassium carbonate were suspended in 1053 ml of NMP under nitrogen in a 4 L reactor with internal thermometer, gas-inlet tube, and reflux condenser with water separator. The mixture is heated to 190° C. within 1 hour. The residence time at 190° C. is considered to be the reaction time. The water of reaction was removed by distillation, and the fill level was kept constant by adding NMP during the reaction. After 3.5 h of reaction time, the reaction was terminated by dilution with cold NMP (1947 ml), and then at 140° C., methyl chloride (10 l/h) was introduced (for 45 minutes) into the mixture. Nitrogen was then introduced (20 l/h), and the mixture was cooled. The resultant potassium chloride was removed by filtration.

The polymer solution was further diluted to a concentration of 928 g of polymer/4.5 l of NMP by adding 1.5 l of NMP. Said solution was heated to 100° C. in the presence of 100 g silica gel (70-230 mesh), surface according to BET 500 m²/g, for 30 minutes while stirring (work-up according to DE 102 21 177). Subsequently, the silica gel was filtered off and the polymer was isolated and worked-up as described above.

TABLE 1

|  | V1 | 2 | 3 | V4 | V5 |
|---|---|---|---|---|---|
| Hydrogen pressure for hydrogenation process [bar] | — | 40 | 20 | — | — |
| Hydrogenation temperature [° C.] | — | 100 | 115 | — | — |
| Intrinsic viscosity [ml/g] | 43.5 | 45.2 | 45.4 | 44.5 | 45.1 |
| Transmittance [%] | 81.3 | 77.8 | 83.9 | 78.2 | 78.3 |
| YI | 40.0 | 35.3 | 28.4 | 51.2 | 47.1 |
| Q | 1.39 | 1.22 | 1.14 | 1.51 | 1.35 |
| Soluble content [%] | 87.1 | 97.2 | 98.1 | 86.2 | 86.5 |
| Mw [g/mol] | 48200 | 44000 | 43100 | 47500 | 47100 |

Examples 2 and 3 according to the invention show that by the process for the work-up of polymer solutions in the presence of a hydrogenation catalyst and hydrogen polymers (products) are obtained, which show a significantly improved yellowness index (YI).

Comparative example V4 shows the work-up of a polymer solution according to the process of document DE 195 01 063. Comparative example V5 shows the work-up according to a process as described in document DE 102 21 177. The examples prove that by the work-up process according to the invention polymers are obtained which show a significantly improved yellowness index (YI).

The invention claimed is:

1. A process for the work-up of a polymer solution comprising hydrogenating the polymer solution with hydrogen in the presence of a hydrogenation catalyst, wherein the polymer solution comprises N-Methyl-2-pyrrolidone and a polymer.

2. The process according to claim 1, wherein the polymer is a polyarylene ether.

3. The process according to claim 1, wherein the hydrogenation catalyst is a heterogeneous hydrogenation catalyst comprising (i) from 10 to 99.999% by weight of aluminum oxide and/or of zinc oxide and (ii) from 0.001 to 90% by weight of cobalt, nickel, copper, palladium, or a mixture of these, where the total of the % by weight values is based on the total of (i) and (ii) and does not exceed 100% by weight.

4. The process according to claim 2, wherein the hydrogenation catalyst is a heterogeneous hydrogenation catalyst comprising (i) from 10 to 99.999% by weight of aluminum oxide and/or of zinc oxide and (ii) from 0.001 to 90% by weight of cobalt, nickel, copper, palladium, or a mixture of these, where the total of the % by weight values is based on the total of (i) and (ii) and does not exceed 100% by weight.

5. The process according to claim 1, wherein the process is carried out at a pressure of from 1 bar to 320 bar.

6. The process according to claim 4, wherein the process is carried out at a pressure of from 1 bar to 320 bar.

7. The process according to claim 1, wherein the process is carried out at a temperature of from 20 to 250° C.

8. The process according to claim 6, wherein the process is carried out at a temperature of from 20 to 250° C.

9. The process according to claim 1, wherein the process is carried out in a fixed bed or in suspension.

10. The process according to claim 4, wherein the process is carried out in a fixed bed or in suspension.

11. The process according to claim 8, wherein the process is carried out in a fixed bed or in suspension.

12. A product obtained from the process according to claim 1.

13. A product obtained from the process according to claim 11.

14. A process for producing polymer products which comprises utilizing a polymer solution comprising N-Methyl-2-pyrrolidone and a polymer.

15. The process according to claim 14, wherein the polymer is a polyarylene ether.

16. A process for producing a polyarylene ether, which comprises
   (A) carrying out a polymerization reaction to produce the polyarylene ether
   (B) removing inorganic constituents of the solution
   (C) working the solution up according to the process of claim 1
   (D) producing polyarylene ether beads from the solution by separation into a precipitation bath, and
   (E) extracting and drying the polyarylene ether beads.

17. A product obtained by the process of claim 16, where the yellowness index of a molding produced from polyarylene ether beads is from 20 to 79, measured in accordance with DIN 6167.

18. A product obtained by the process of claim 16, where the dimethylacetamide-soluble content of a molding produced from polyarylene ether beads, after heat-aging at 400° C. for 1 h, is from 92 to 99.5% by weight, where the total of the % by weight values is based on the total weight of the molding after heat-aging and the total does not exceed 100% by weight.

* * * * *